UNITED STATES PATENT OFFICE.

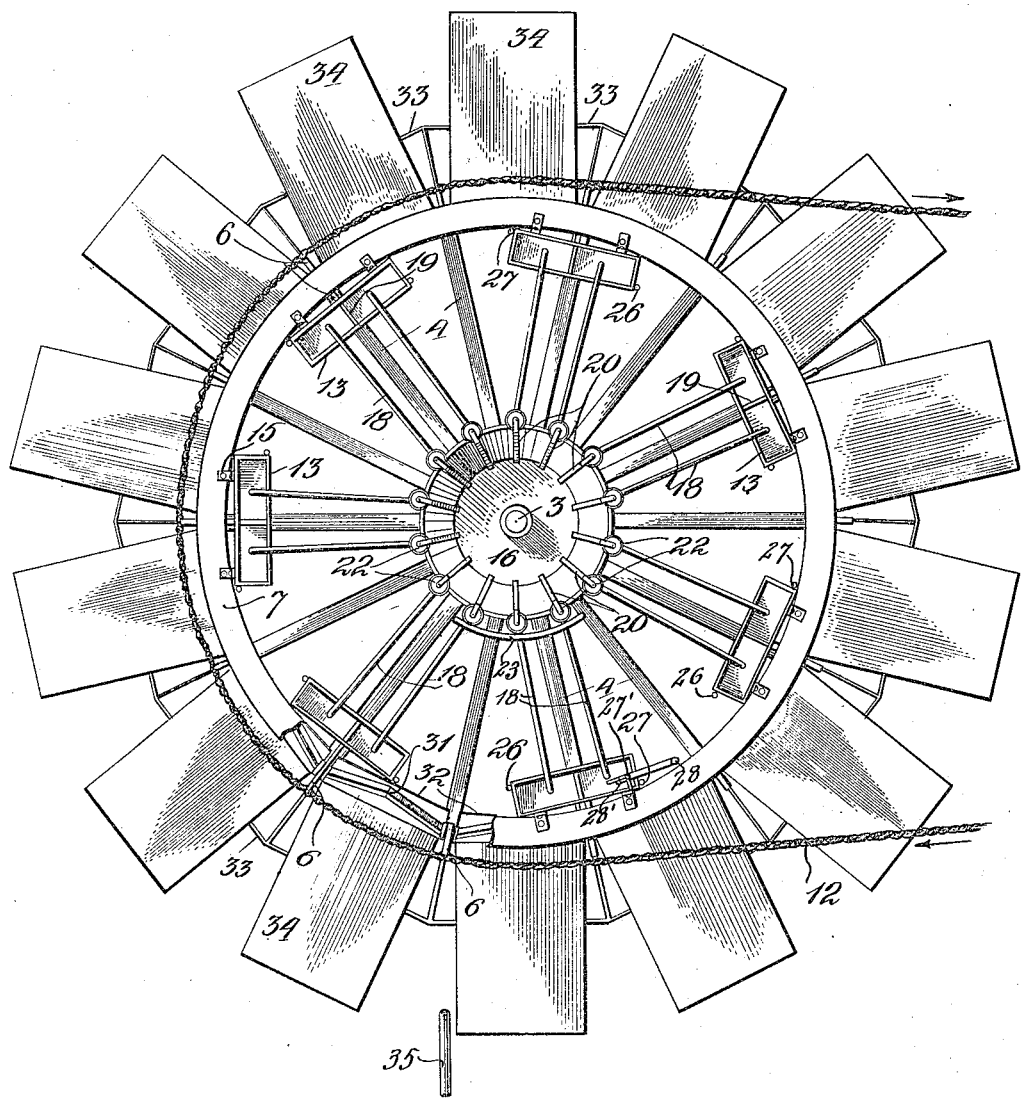

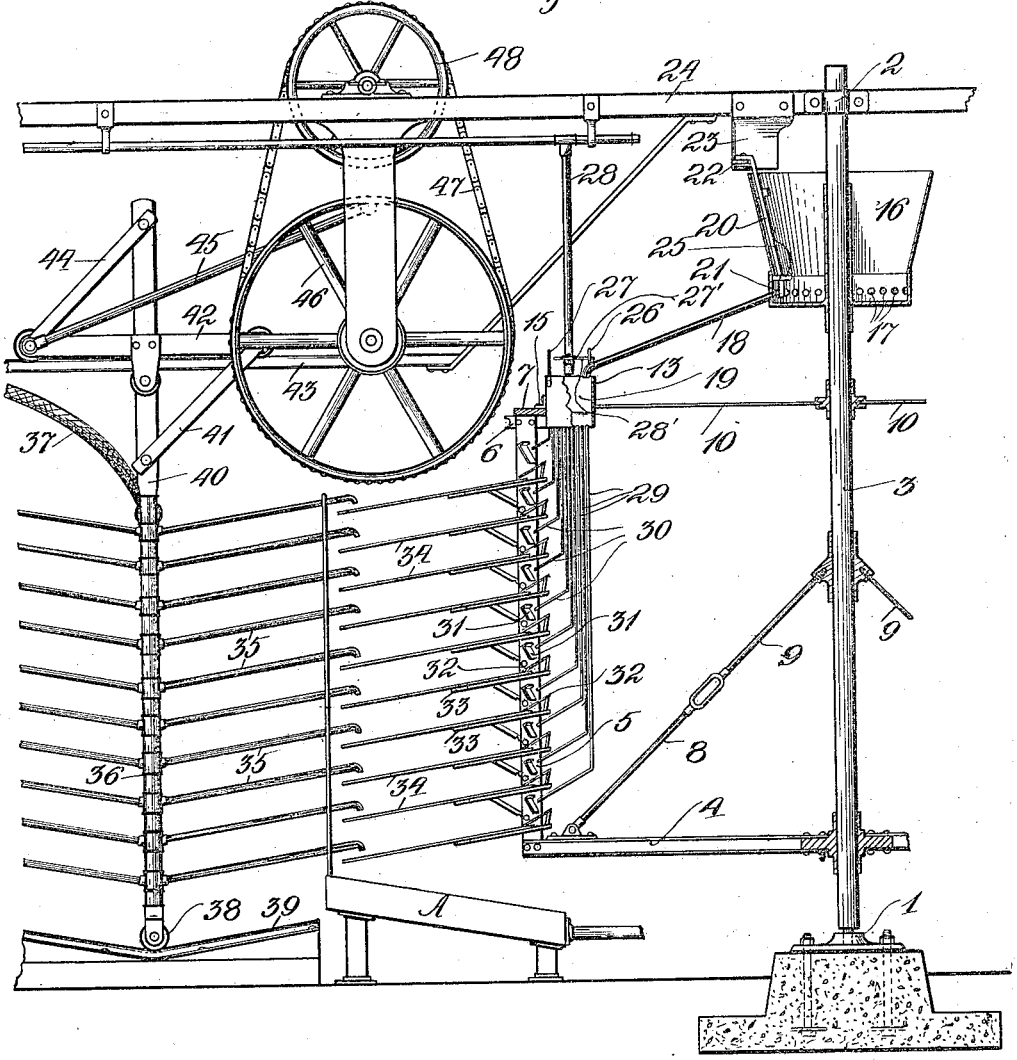

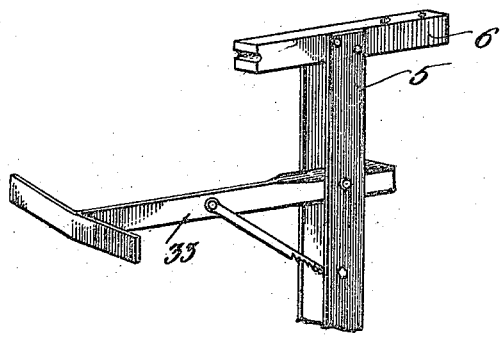
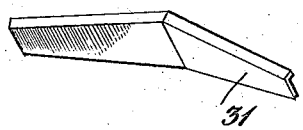
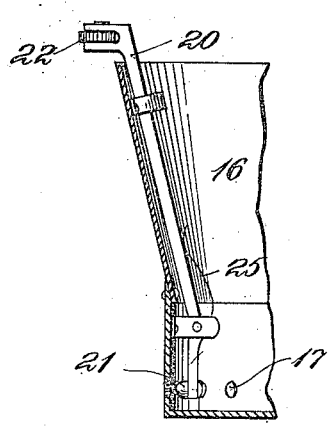
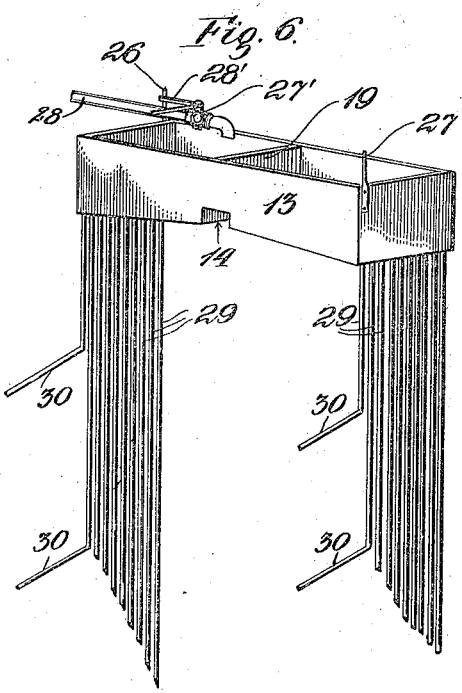

WILLIAM F. GONGAWARE, OF OCEANPARK, CALIFORNIA.

SEPARATOR.

1,244,191.  Specification of Letters Patent.  Patented Oct. 23, 1917.

Application filed June 1, 1915. Serial No. 31,606.

*To all whom it may concern:*

Be it known that I, WILLIAM F. GONGAWARE, a citizen of the United States, residing at Oceanpark, in the county of Los Angeles and State of California, have invented a certain new and useful Improvement in Separators, of which the following is a specification.

My invention relates to an apparatus for treating materials containing metallic values, and has particular reference to a device for separating the values from slimes, an object of this invention being to provide a simple construction in which the slimes are thoroughly washed away and the values recovered at a minimum use of power and expense.

Other objects will appear from the subjoined specification and claims, in connection with the accompanying drawings, in which Figure 1, is a plan view with parts removed.

Fig. 2, is an elevation, partly in section, showing one series of trays and the distributing pipes; and the concentrates removing system.

Fig. 3, is a perspective detail showing one of the adjustable tray supports.

Fig. 4, is a perspective view of one of the slime spreaders.

Fig. 5, is an enlarged fragmentary section of the hopper showing one of the valves in position.

Fig. 6, is a perspective view of one of the distributing boxes.

The invention consists of a plurality of series of superposed trays circularly arranged and mounted on a revoluble frame, and since the construction and arrangement of each series with its complementary adjuncts is the same, the description of but one series will suffice for all.

In suitable bearings 1 and 2, is rotatably mounted a vertical shaft 3, to which is rigidly secured a frame, consisting of radial arms 4, on the end of each of which is rigidly fixed a pair of vertical standards 5, spaced at their upper ends by and secured to a horizontal member 6, onto which is fastened an annular ring 7. The radial arms 4, are suitably supported by adjustable rods 8 and 9, and braces 10, are provided to give stability to the frame.

Said members 6, are provided with a groove for the accommodation of a driving rope 12, and extend inwardly beyond the annular ring 7, for the purpose of forming a support for a plurality of circularly disposed distributing boxes 13, each of which is furnished with a central groove 14 on its under side as shown in Fig. 6, in which the members 6, fit, these boxes being held against displacement by angle pieces 15, bolted to the ring 7 and to the boxes. Near the upper end of said shaft 3, is fastened a cylindrical hopper 16, provided in the bottom thereof with a plurality of threaded apertures 17, into which are fitted a plurality of feed pipes 18, radiating therefrom and being depressed to the horizontal to cause the slimes conveyed into the hopper 16, to flow by gravity into the distributing boxes, 13, each of which is divided into two compartments by a partition 19, and over each of which compartments, a feed pipe 18, extends. Within the hopper 16, are pivoted a plurality of levers 20, provided at their lower ends with valves 21, disposed in operative relation to said apertures 17. The other ends of said levers 20, project beyond the top of the hopper, and are provided with horizontal rollers 22, that are arranged to successively strike against a plate 23, depending from and made fast to a beam 24, whereby the levers are moved about their pivots, thus causing the valves to close the apertures in regular succession and hold same closed for a predetermined length of time, as and for purposes appearing hereinafter. Springs 25, are provided to hold said levers in normally inoperative position, as shown in Figs. 2 and 5.

Each distributing box 13, is provided on its forward inward corner, and on its rearward outward corner with a vertically rising finger 26 and 27, respectively, for respectively opening and closing a valve 27', on a water supply pipe 28, in substantially the following manner: The valve stem of the valve 27', is furnished with a two-armed lever 28', one arm of which normally extends in the path of the fingers 26. During the rotation of the apparatus, the fingers 26, striking the extended arm of the lever 28', open the valve 27', and permit the water to be supplied to each compartment of the distributing boxes, the valve remaining open only for a period of time required for the traverse of the distributing boxes under the discharge nozzle of the supply pipe 28. When the fingers 26, strike one arm of the lever 28', the other arm is moved in the path of the fingers 27, which, engaging the same after the boxes have passed beyond, or nearly so, the nozzle of the supply pipe 28, close the valve 27'. The operation of opening and closing the valve 27', proceeds successively in alternation during the operation of the apparatus, and practically with the closing and opening of the valves 21, in the hopper 16; that is to say, the finger 26 opens the valve 27' substantially coincident with the engagement and rocking of the lever 20 by the plate 23 inclosing the valve 21, with the latter held closed during the time the valve 27' is open. The valve 21 is designed to be held closed a short time after closing of the valve 27' by the finger 27 as will appear hereinafter. The floor of each compartment of each distributing box 13, is inclined to cause the material supplied thereto to flow to the end thereof, and depending from each end of the distributing boxes 13, is a series of distributing pipes 29, the ends 30, of which are extended outwardly and in a direct line with the apexes of a plurality of V-shaped angularly disposed spreaders 31, fastened between each pair of vertical standards 5, and which spreaders serve to spread the material to be treated over a plurality of inclined plates 32, which are mounted on the rear ends of T-arms 33, which are pivotally and adjustably mounted in said standards 5, and the branches of which form supports for a plurality of preferably inclined trays 34, suitably covered, and the inclination of which may be regulated according to need, by such adjustable arms.

The adjustment of the inclination of the arms 33 and the trays 34 thereon is effected by means of a downwardly and rearwardly extending supporting bar 50 which is pivotally connected at 51 to the arm and is formed with a series of teeth or serrations 52, which serrations are adapted to engage a pin 53 carried by the post 5, as particularly shown in Fig. 3.

The front edges of the inclined plates 32, are elevated a sufficient distance from the arms 33, to enable the trays to be slid or inserted therebetween and be held thereby without any other or permanent fastening.

After the tailings have been washed away, the concentrates remain on the trays and these are washed off into a receptacle A, by a plurality of sprays, issuing from branch pipes 35, lying in the same parallel plane as the trays 34, and connected with a vertical pipe 36, to which water is supplied through a hose 37. This pipe 36, is mounted on a grooved roller 38, traveling on a doubly inclined track 39. In the upper end of said pipe 36, is secured a stem 40, to the lower end of which is pivotally connected one end of a link 41, the other end of which is pivotally attached to one end of a carriage 42, arranged to move reciprocably on a trackway 43. To the other end of the carriage 42, is pivotally attached one end of a similar link 44, the other end of which is pivotally connected to the upper end of said stem 40. By this link arrangement, the vertical position of the pipe 36, and the position of the branch pipes 35, relatively to the trays, is always maintained during the movement thereof on the doubly inclined track 39. The reciprocation of the carriage 42, and its complementary parts, is accomplished by a rod 45, connected to a suitably journaled eccentric wheel 46, and with one end of the carriage, the eccentric wheel receiving power from a chain 47, running over a suitable drive wheel 48.

The concentrates removing sprays from the branch pipes 35, do not begin to play on the trays 34, until the wash water from the distributing boxes 13, has ceased to flow through the distributing pipes 29. The trays at that time successively travel within the range of the reciprocating sprays, which by back and forth movement in radial relation to the rotating frame and the trays thereon, wash off the concentrates that fall into the receptacle A. Obviously those valves 21, within the hopper 16 controlling the flow of material to the trays through the distributing boxes 13, must be closed and remain closed during the operation of the sprays, and this is accomplished in the manner hereinbefore set out, by the plate 23, which moves the levers 20, and holds the valves thereon, seated for a length equal to the length of time required for the passage of one series of trays under the reciprocating sprays after the cutting off of the supply of water by closing of the valve 27'. The water from the pipe 28, flowing only after cessation of the flow of material through the feed pipes 18, serves to remove all the material from the distributing boxes 13, and the distributing pipes leading therefrom, and especially to remove the tailings from the trays prior to the concentrates removing operation of the sprays.

What I claim is:—

1. A separator comprising a rotatable frame; a plurality of series of circularly arranged superposed trays loosely mounted on said frame, means for adjusting the inclination of said trays, a plurality of distributing boxes on said frame, a plurality of pipes to distribute material to said trays from said boxes, a wash water supply for said boxes, a material receiving hopper, pipes to convey the material to said distributing boxes from said hopper, a reciprocating hydraulic means to remove the concentrates from said trays, valves in said hopper and controllable by the rotation of said frame to cut off the supply of material to, and during the supply of wash water to said distributing boxes, and means on said boxes to cause the wash water to be supplied to said boxes and to cut off the supply of wash water during the operation of the hydraulic removing means.

2. In a separating apparatus, a hopper, a discharge pipe leading from said hopper, a normally open valve for regulating the flow of materials from the hopper, a distributing box into which the discharge pipe opens, a rotary frame carrying said hopper and distributing box, a water supply pipe arranged to discharge into the distributing box, a valve on said supply pipe, means on the distributing box for opening the valve as the box passes thereunder, means for closing the valve on the passing of the box from therebeneath, means coöperating with the rotation of the frame for closing the valves to the discharge pipes during the interval at which the valve on the water pipe is maintained open, discharge pipes leading from the box, inclined trays above which said last-named pipes open, and nozzles arranged to deliver concentrates removing sprays to said trays after the closing of the fresh water valve and while the hopper valve is closed.

3. In a separating apparatus, a hopper, a discharge pipe leading from said hopper, a normally open valve for regulating the flow of materials from the hopper, a distributing box into which the discharge pipe opens, a rotary frame carrying said hopper and distributing box, a water supply pipe arranged to discharge into the distributing box, a valve on said supply pipe, means on the distributing box for opening the valve as the box passes thereunder, means for closing the valve on the passing of the box from therebeneath, means coöperating with the rotation of the frame for closing the valves to the discharge pipes during the interval at which the valve on the water pipe is maintained open, discharge pipes leading from the box, inclined trays above which said last-named pipes open, nozzles arranged to deliver concentrates removing sprays to said trays after the closing of the fresh water valve and while the hopper valve is closed, and means for advancing and retracting nozzles longitudinally of the trays and in radial relation to the rotating frame.

4. In a separating apparatus, a series of inclined trays, a feed hopper, a distributing box, a rotary frame carrying said trays, hopper and box, distributing pipes leading from the box and opening to the trays, automatic valve controlled means for intermittently delivering materials from the hopper to the box, automatic valve controlled means for delivering wash water to the box alternate with the delivery of materials from the hopper, and means for directing concentrates removing sprays to said trays intermediate the deliveries of wash water and materials thereto from the distributing box.

5. In a separating apparatus, a series of inclined trays, a feed hopper, a distributing box, a rotary frame carrying said trays, hopper and box, distributing pipes leading from the box and opening to the trays, automatic valve controlled means for intermittently delivering materials from the hopper to the box, controlled by rotation of the frame, automatic valve control means for delivering wash water to the box alternate with the delivery of materials from the hopper, and means for directing concentrates removing sprays to said trays intermediate the deliveries of wash water and materials thereto from the distributing box.

6. In a separating apparatus, a series of inclined trays, a feed hopper, a distributing box, a rotary frame carrying said trays, hopper and box, distributing pipes leading from the box and opening to the trays, automatic valve controlled means for intermittently delivering materials from the hopper to the box, automatic valve controlled means for delivering wash water to the box alternate with the delivery of materials from the hopper, means on the box controlling the delivery of the wash water on rotation of the frame, and means for directing concentrates removing sprays to said trays intermediate the deliveries of wash water and materials thereto from the distributing box.

7. In a separating apparatus, a series of inclined trays, a feed hopper, a distributing box, a rotary frame carrying said trays, hopper and box, distributing pipes leading from the box and opening to the trays, automatic valve controlled means for intermittently delivering materials from the hopper to the box, controlled by rotation of the frame, automatic valve controlled means for delivering wash water to the box alternate with the delivery of materials from the hopper, means on the box controlling the delivery of the wash water on rotation of the frame, and means for directing concentrates removing sprays to said trays intermediate the deliveries of wash water and materials thereto from the distributing box.

8. A separator, comprising a rotary frame, a pulp hopper, a distributing box, a series of inclined concentrating trays, said hopper, box and trays mounted on the frame to rotate therewith, a normally open communication between the hopper and box, means for closing said communication at intervals during the rotation of the frame, means for delivering water to the box when said communication is closed, means for distributing the pulp and water from the box to the trays, and means for intermittently delivering concentrates removing sprays to the trays.

In testimony whereof I affix my signature in the presence of two witnesses.

WILLIAM F. GONGAWARE.

Witnesses:
ANTON GLOETZNER, Jr.,
E. L. STILWELL.